Jan. 20, 1959    M. FUNKHOUSER ET AL    2,869,685
INERTIA CONTROLLED SHOCK ABSORBER SYSTEM

Filed April 11, 1955    2 Sheets-Sheet 1

INVENTORS
MEARICK FUNKHOUSER
BY HAROLD E. SHULTZE

ATTORNEY

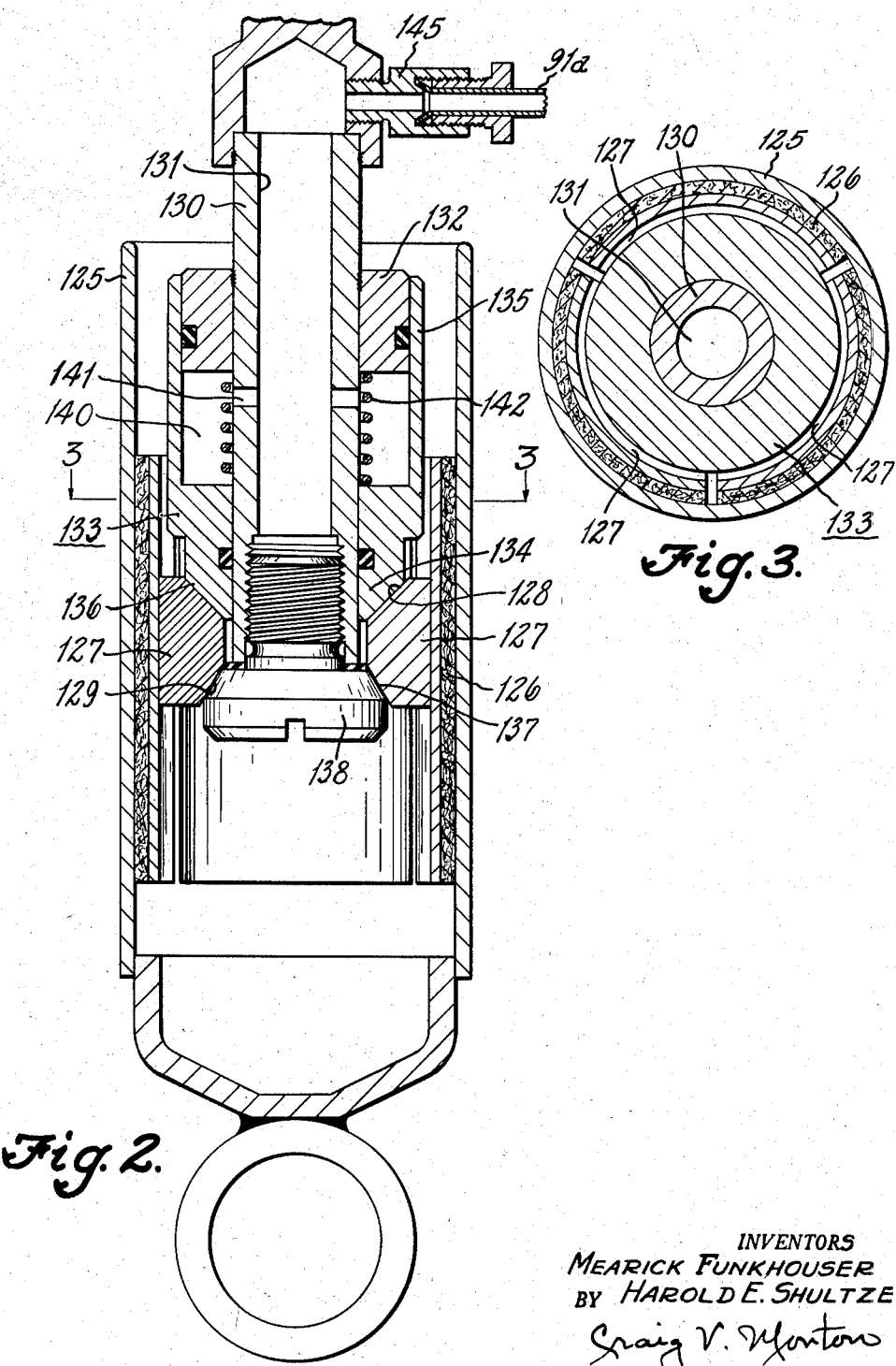

United States Patent Office 2,869,685
Patented Jan. 20, 1959

---

2,869,685

INERTIA CONTROLLED SHOCK ABSORBER SYSTEM

Mearick Funkhouser and Harold E. Schultze, Dayton, Ohio, assignors to General Motors Corporation, Detroit, Mich., a corporation of Delaware Application April 11, 1955, Serial No. 500,462

8 Claims. (Cl. 188—87)

This invention relates to a shock absorbing system, and a shock absorber for the same, adapted for use on motor vehicles to damp relative movements between the axle and the body of the vehicle.

It has been conventional practice in the shock absorber art to provide shock absorbers between the body and axle of a motor vehicle that damped relative movement between the car body and car axle in a manner that the damping is largely a compromise between the energy absorption requirements needed when the motor vehicle is passing over smooth roads and that needed when the vehicle is passing over rough roads. When a vehicle passes over choppy roads with little or no body movement, there is a large amount of an axle movement of the vehicle that could be a free movement. Such a condition arises when the vehicle is passing over what is termed a corduroy road. The short choppy oscillations imparted to the vehicle axle by this type of road can largely be dissipated in the spring system for the vehicle without major damping action from the shock absorber. At least this is true until the car body begins to swing in a synchronous motion. As soon as the car body begins to move, then additional energy dissipation must be taken on by the shock absorber.

In other words, so long as the car body of the vehicle rides relatively level, the shock absorber need not have a high degree of energy absorption. Rather, the unsprung weight, such as the axle and wheels of the vehicle can be left relatively free.

However, since the shock absorber is provided primarily for the purpose of giving a comfortable ride to the passengers of the vehicle, the movement of the car body relative to the road over which the vehicle is traveling is that condition which should be most actively controlled. Thus, when the road conditions are such as to effect movement of the car body relative to the road, then the energy dissipation by the shock absorber must be greater to retard the movement of the car body in its up and down oscillating movement.

It is therefore an object of this invention to provide a shock absorbing system adapted for use on motor vehicles wherein the shock absorber connected between the axle and body of a vehicle will permit relatively free movement of the axle of the vehicle relative to the body until the body begins movement as a result of the shock condition and thereafter additional resistance is applied to the shock absorber to increase the energy absorbed by the shock absorber.

It is another object of the invention to provide a shock absorbing system to accomplish the foregoing object wherein an inertia responsive mechanism controls the action of the shock absorber, the inertia responsive mechanism being in turn responsive to car body movement to control the shock absorber in response to the car body movement.

Another object of the invention is to provide a shock absorber having a fluid pressure sensitive control device that is adapted to change the energy absorption characteristics of the shock absorber in response to changes in fluid pressure applied to the fluid pressure sensitive control device, and to control the change in fluid pressure to the fluid pressure sensitive control device of the shock absorber in response to a signal means external of the shock absorber and energized to regulate the sensitivity of the said device.

It is another object of the invention to provide a shock absorber for accomplishing the foregoing object wherein the energy absorbing mechanism of the shock absorber is carried on an operating rod that is provided with a longitudinally extending fluid conducting passage to effect transmission of fluid under pressure from an external source to the fluid pressure sensitive control device to render it active and inactive in response to changes in fluid pressure as transmitted through the hollow operating rod of the shock absorber.

It is another object of the invention to provide a shock absorber for accomplishing the foregoing object wherein the energy absorbing mechanism of the shock absorber is carried on an operating rod that is provided with a longitudinally extending fluid conducting passage to conduct fluid under pressure to the fluid pressure sensitive control device to render it active and inactive in response to changes in fluid pressure delivered thru the operating rod of the shock absorber as controlled by an inertia device.

Further objects and advantages of the present invention will be apparent from the following description, reference being had to the accompanying drawings wherein a preferred form of the invention is clearly shown.

In the drawings:

Figure 2 is a cross sectional view of a modified form of shock absorber that can be incorporated in the system shown in Figure 1.

Figure 3 is a cross sectional view taken along line 3—3 of Figure 2.

Figure 1:
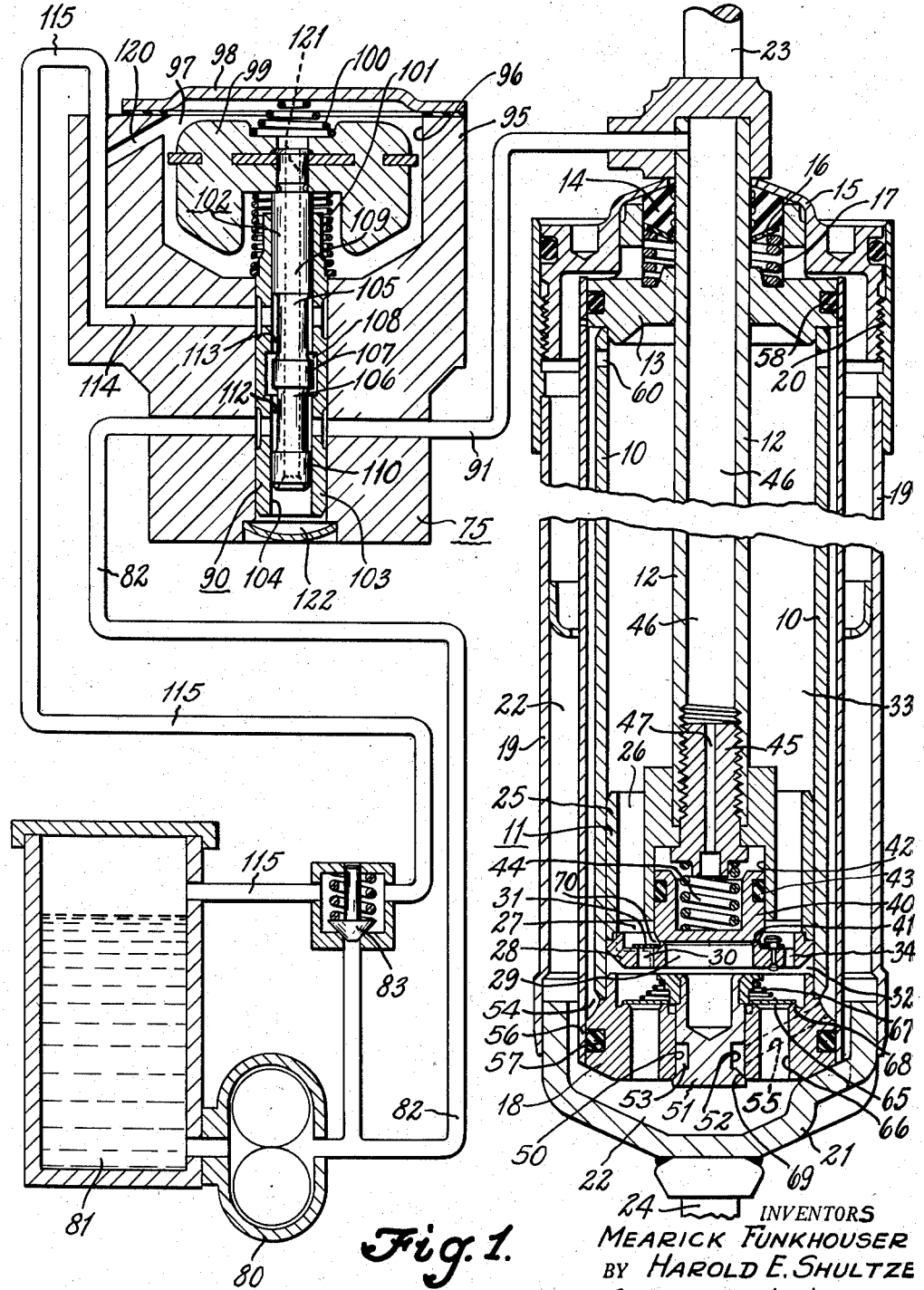
Figure 1 is a diagrammatic illustration of a shock absorbing system for a motor vehicle showing the shock absorber and the inertia control device for the same in cross section.

In this invention the shock absorber comprises a cylinder 10 having a piston 11 reciprocable in the cylinder. The piston 11 is carried on one end of an operating rod 12 that projects through a rod guide member 13 secured on one end of the cylinder 10, and which closes that end of the cylinder. The operating rod 12 projects through the rod guide member 13 and is provided with a resilient seal 14 around the operating rod 12.

The seal 14 is carried between a cap member 15 and a retainer 16 that is held under pressure against the seal 14 by means of a compression spring 17.

The opposite end of the cylinder 10 is closed by a closure member 18 that is secured to the cylinder 10. A cylinder wall 19 encloses the working cylinder 10 and depends from the cap 15 as secured thereto by the threaded connection 20. The cylinder 19, together with the end cap 21 forms a reservoir chamber 22 for hydraulic fluid circulated in the working cylinder 10 in a manner hereinafter described.

The operating rod 12 carries a mounting fitting 23 while the cap 21 carries a mounting fitting 24 whereby the shock absorber can be connected between the body and axle of a motor vehicle, relative movement between the body and the axle effecting reciprocation of the piston 11 in the cylinder 10.

The piston 11 comprises a cylindrical body member 25 that has a plurality of longitudinally extending passages 26 therein terminating in a recess chamber 27 at one end of the body 25. The recess chamber 27 is closed by means of a cover plate 28 that has a central opening 29 through which hydraulic fluid flows through the piston between opposite ends of the cylinder 10 upon reciprocation of the piston 11 in the cylinder 10.

The cover plate 28 is provided with one or more orifice passages 30 and 34 to permit controlled flow of fluid by the orifice passages from the cylinder chamber 32 on one side of the piston to the cylinder chamber 33 on the opposite side of the piston. The orifice passages 30 are closed by a valve 31 to prevent flow of hydraulic fluid from the cylinder chamber 33 to the cylinder chamber 32.

The main flow passage 29 in the piston 11 is controlled by a valve piston 40 that seats upon a valve seat 41 provided around the periphery of the opening 29. The valve piston 40 slides within a fluid receiving chamber 42 disposed axially in the piston 11, an O ring seal 43 being provided between the piston valve 40 and the wall of the chamber 42. A compression spring 44 disposed between the piston valve 40 and the retainer member 45 normally urges the valve 40 upon its seat 41.

The operating rod 12 has a longitudinally extending fluid conducting passage 46 provided therein, and the retainer member 45 has the passage 47 to provide for delivery of fluid under pressure into the receiving chamber 42 in the piston 11 in a manner hereinafter described.

The closure member 18 on the lower end of the cylinder 10 has an axial bore 50 in which a valve 51 is slidably positioned. The valve 51 has an annular recess 52 to provide a chamber 53 in cooperation with the bore 50 in the closure member 18. The chamber 53 is connected with a cylindrical chamber 54 by means of a conduit passage 55.

The chamber 54 is formed by means of a cylindrical tube 56 surrounding the cylinder 10 and projecting over the outer peripheries of the closure members 18 and 13 at opposite ends of the cylinder 10. O ring seals 57 and 58 engage the cylinder 56 and thereby close the chamber 54.

The upper cylinder chamber 33 of the shock absorber connects with the chamber 54 through means of a passage 60 provided in the upper end of the cylinder 10 whereby flow of fluid can be conducted from the cylinder chamber 33 through the passage 60 and the chamber 54, and through passage 55 to the chamber 53 around the valve 51 in the closure member 18.

The valve 51 is encircled by a valve member 65 that closes a plurality of passages 66 disposed around the bore 50. A light compression spring 67 is confined between the valve member 51 and the valve member 65 to retain the valve member 65 upon its seat 68 and retain the valve seat 69 of the valve 51 seated on the edge periphery of the bore 50 in the closure member 18.

On the compression stroke of the shock absorber just described, that is when the piston 11 moves toward the closure member 18, the hydraulic fluid is placed under pressure in the cylinder chamber 32. The pressure of the fluid in the cylinder chamber 32 causes the valve member 51 to move downwardly and thereby open the chamber 53 to the reservoir chamber 22. As the piston 11 moves downwardly, the first action of the hydraulic fluid placed under pressure in the chamber 32 is to pass through the restricted orifices 30 and 34, valve 31 opening at this time. As the pressure in the cylinder chamber 32 continues to build up as a result of downward movement of the piston 11 toward the closure member 18, the piston valve 40 will be lifted from its seat so that there is then a major flow of hydraulic fluid from the cylinder chamber 32 into the cylinder chamber 33. Excess volume of hydraulic fluid passing from the cylinder chamber 32 into the cylinder chamber 33 will be discharged from the cylinder chamber 33 through the passage 60 and the chamber 54 and passage 55 through the now open valve 51 into the reservoir chamber 22.

Thus, on the compression stroke of the shock absorber, the orifices 30 and 34 and the valve member 40 provide the desired control over the flow of hydraulic fluid from the cylinder chamber 32 into the cylinder chamber 33 to effect the desired energy absorption resulting from the relative movements of the piston and cylinder of the shock absorber.

On the rebound stroke of the shock absorber, that is when the piston 11 is moving toward the closure member 13 and away from the closure member 18, the hydraulic fluid in the cylinder chamber 33 will be placed under pressure. As the fluid is placed under pressure in the cylinder chamber 33, the effect of the pressure will be transmitted through the passage 60, the chamber 54 and the passage 55 to the chamber 53 around the valve 51 in the closure member 18. However, since the annular recess 52 forming a chamber 53 has equivalent areas exposed to the pressure of the hydraulic fluid, the valve is hydraulically balanced and the spring 67 will thus hold the valve 51 in closed position as illustrated in Figure 1 thereby preventing any flow of hydraulic fluid from the cylinder chamber 33 through the valve 51.

The hydraulic fluid under pressure in the cylinder chamber 33 will thus be required to flow through the orifice passages 34 in the head of the piston 11. Valve 31 in the head 28 of the piston 11 is closed at this time. As the pressure continues to build up in the cylinder chamber 33, the effect of the pressure will react on the reaction area 70 of the valve 40 to raise it against the pressure of the spring 44 and thereby allow flow of hydraulic fluid from the cylinder chamber 33 into the cylinder chamber 32 under control of the orifices 34 and the valve 40.

As the piston 11 moves away from the closure member 18, the volume of hydraulic fluid transferred from the chamber 33 to the chamber 32 is less than the increasing volume of the chamber 32. Thus at this time the valve member 65 raises against the light pressure of the spring 67 to permit hydraulic fluid to flow through the passages 66 into the cylinder chamber 32 from the reservoir 22 to retain the cylinder chamber 32 completely filled with hydraulic fluid.

From the foregoing description it will be apparent that the energy absorption effected by the shock absorber is controlled first by the orifices 30 and 34 and then by the main control valve 40 in both directions of flow of fluid between the cylinder chambers 32 and 33.

The spring 44 that retains the valve 40 on its seat is a relatively light spring so that a relatively low fluid pressure in the cylinder chambers 32 and 33 will effect opening movement of the valve piston 40. Thus, the piston 11 is relatively free to move in the working cylinder 10 of the shock absorber. Under this condition, rapid movement of the axle of the vehicle can take place rather freely since the resistance to flow of hydraulic fluid in the shock absorber between the cylinder chambers 32 and 33 is lightly opposed by the action of the valve 40 as controlled by the light compression spring 44. Such action of the shock absorber is satisfactory over a choppy road condition until the body of the vehicle begins to move. If the axle movement of the vehicle is such as to cause no substantial body movement of the vehicle, the shock absorber will only lightly resist the action of the axle movements so that these movements can be largely absorbed by the springs of the vehicle.

This type of action of the shock absorber is permitted until the reaction of axle movements through the springs are such as will effect movement of the car body. At this time an inertia responsive mechanism 75 that is also responsive to movements of the car body takes over control of the shock absorber to provide for an increase in the resistance to flow of hydraulic fluid between the chambers 32 and 33 of the cylinder 10 sufficient to provide the desired damping effect or energy absorption to retard the body movements of the vehicle to a desired level.

The control system for the shock absorber includes a fluid pump 80 driven by any suitable source of power on the vehicle. The pump 80 may receive hydraulic fluid from a reservoir 81 and deliver the fluid under pressure into the discharge line 82. A pressure relief valve 83 is provided to bypass high pressure discharge from the pump 80 when the pressure increases above a desirable level.

The fluid discharge line 82 from the pump 80 delivers fluid to a fluid flow control valve 90 provided in the inertia responsive mechanism 75. Controlled flow of fluid is delivered from the control valve 90 through the line 91 into the fluid conducting passage 46 of the operating rod 12 that connects with a piston 11 of the shock absorber, whereby fluid under pressure can be delivered to the chamber 42 in the piston 11 of the shock absorber to react on the valve piston 40 to change the pressure value at which the valve 40 will be lifted from its seat as a result of the pressure reaction in the cylinder chambers 32 and 33 of the shock absorber.

From the foregoing description it is apparent that the fluid pressure control system for the valve piston 40 is isolated from the fluid in the shock absorber and may comprise any suitable source of pressure fluid adapted for control.

The inertia responsive mechanism 75 that includes the flow control valve 90, includes a body 95 that is adapted to be mounted on the car body of a motor vehicle. The body 95 has a chambered recess 96 forming a chamber 97 that is closed by a cover plate 98. A weight mass 99 is positioned in the chamber 97 and is normally disposed in a suspended position within the chamber 97 by means of the balance spring 101. Spring 100 acts as a bumper to limit upward movement of the weight mass 99.

The weight mass 99 has the property of tending to remain at rest unless it is acted upon by some external force, in this instance the movement of the body 95 relative to the mass 99. With the weight mass 99 tending to remain at rest the movement of the body 95 relative thereto effects signal operation of the inertia responsive mechanism 25.

The weight mass 99 is carried on the upper end of a valve stem 102 that is slidably positioned in the valve body 103 of the valve 90.

The valve body 103 has a longitudinally extending valve bore 104 that receives the valve stem 102. The valve stem 102 is provided with the under cut portions 105 and 106 separated by the annular land portion. The annular land portion 107 is normally disposed in an enlarged chamber 108. The valve stem 102 is also provided with the land portions 109 and 110 that are slidably disposed in the bore 104.

When the valve stem 102 of the valve 90 is in the position shown in Figure 1, fluid under pressure is free to pass from the discharge line 82 from the pump into the chamber 112 around the reduced diameter portion 106 and thence through the chamber 108 into the chamber 113 around the reduced diameter portion 105 of the stem and thence into the passage 114 in the body 95 and from there into the conduit 115 for return to the reservoir 81. The flow circuit just described thus provides for continuous circulation of fluid from the pump 80 through the control valve 90 and return to the reservoir 81.

So long as the valve stem 102 of the valve 90 is disposed in the position shown in Fig. 1, the fluid discharged from the pump 82 will have no effect upon the valve piston 40 in the piston 11 since the fluid is free to return to the reservoir. However, whenever the car body of the vehicle moves vertically relative to the road over which the vehicle is traveling there will be effected relative movement between the weight mass 99 and the body 95 of the inertia responsive mechanism 75 since the weight mass 99 tends to remain stationary upon movement of the body 95 relative to the car axle. The relative movement effected between the weight mass 99 and the body 95 will cause the valve stem 102 to move in either an upward or a downward direction depending upon the initial direction of movement of the car body. However, in either movement of the valve stem 102 relative to the valve body 103 the land area 107 approaches either the chamber 112 or the chamber 113 to restrict the flow of fluid from the discharge line 82 to the reservoir return passage 114. This restriction of flow of fluid causes the fluid pressure in the line 91 to increase and thereby increase the fluid pressure in the passage 46 of the operating rod 12 of the shock absorber which in turn increases the pressure of the hydraulic fluid in the chamber 42 in the piston 11 of the shock absorber. As the pressure in the chamber 42 increases, the valve piston 40 is caused to seat more firmly upon its seat 41 in the head 28 of the piston 11. Thus, there will be required a greater pressure rise of the hydraulic fluid in either of the cylinder chambers 32 and 33 of the shock absorber cylinder 10 to raise the valve 40 from its seat 41 to allow passage of fluid through the opening 29 in the piston head 28, and thereby effect a greater energy absorption in the shock absorber.

Since the degree of movement of the weight mass 99 in the inertia responsive device 75 is directly proportional to the movement of the car body, the value of the pressure increase or pressure variation in the chamber 42 reacting on the valve 40 will be directly proportional to vehicle body movement to obtain the desired value of energy absorption to damp the movement of the car body to the desired degree.

To prevent exceedingly rapid relative movement between the weight mass 99 and the body 95 of the inertia responsive mechanism 75, the chamber 97 containing the weight mass 99 is connected with the reservoir return passage 114 by means of a passage 120 whereby the chamber 97 is filled with hydraulic liquid circulated by the pump 80 to damp reciprocable movement of the mass 99. The valve stem 102 has a passage 121 extending axially thereof to connect with the chamber 122 at the opposite end of the valve stem so that the valve is completely hydraulically balanced and thereby allow the weight mass 99 to be responsive solely to inertia action.

In Figure 2 there is illustrated a friction type of shock absorber adapted for use with the control system illustrated in Fig. 1 whereby the energy absorption of the shock absorber is normally of relatively low value to permit relatively free axle motion, but which is controlled by the inertia responsive mechanism 75 to increase the energy absorption value of the shock absorber in response to movements of the body of a vehicle.

In the structural arrangement of the device of Fig. 2, the shock absorber comprises a cylinder 125 that is slidably engaged by a plurality of arcuately shaped friction elements 126. The friction elements 126 are carried upon arcuately shaped ring segments 127 each of which has the oppositely inclined faces 128 and 129. The friction elements 126 engage substantially the entire inner periphery of the cylinder 125, and the ring segments 127 form substantially a complete ring.

The ring segments 127 are carried upon an operating rod 130 that has a longitudinally extending passage 131 therein that corresponds to the passage 46 in the shock absorber illustrated in Fig. 1.

On the lower end of the operating rod 130 there is provided an annular enlargement 132. A reciprocable element 133 has the lower end portion 134 slidably disposed on the lower end of the operating rod 130 and the upper end portion 135 slidably disposed on the enlarged portion 132 that is fixedly secured to the rod 130.

The ring segments 127 are confined between the annular face 136 on the lower end portion 134 of the member 133 and the angular face 137 on the head 138 of the mounting stud threadedly received in the lower end of the operating rod 130.

The operating rod 130 and the member 133 cooperate to form a fluid pressure receiving chamber 140 that is connected with the passage 131 in the rod 130 by means of a port passage 141. A light compression spring 142 is placed in the chamber 140 and normally urges the reciprocable member 133 toward the head 138 of the mounting stud to confine the ring segments 127 therebetween and lightly urge the friction elements 126 radially outwardly against the inner periphery of the wall of the cylinder 125.

The longitudinally extending passage 131 in the operating rod 130 is provided with the conduit connection fitting 145 that is adapted for connecting the fluid pressure line 91a from the inertia responsive mechanism 75. Thus, delivery of fluid under varying pressure as controlled by the inertia responsive device 75 into the passage 131 and thus into the chamber 140 will cause the reciprocable member 133 to be urged toward the head 138 of the mounting stud with varying degrees of pressure, and thereby urge the friction elements 126 radially outwardly against the cylinder 125 with varying degrees of pressure to change the energy absorption effectiveness of the energy absorbing device in direct proportion to the movements of the car body.

While the form of embodiment of the invention as herein disclosed constitutes a preferred form, it is to be understood that other forms might be adopted as may come within the scope of the claims which follow.

What is claimed is as follows:

1. A shock absorbing system for use on motor vehicles to damp relative movements between the axle and the body of the vehicle, comprising in combination, a movement damping apparatus disposed between the car axle and body of a vehicle and including an energy absorbing mechanism including resistance valve means resiliently held on its seat operable to effect energy absorption upon relative movement between the car axle and body on either compression or rebound stroke of the movement damping apparatus, a source of fluid pressure operably connected with said energy absorbing mechanism to apply fluid pressure to said valve means to retain it on its seat resiliently to vary the energy absorption effectiveness of the energy absorbing mechanism, and a fluid flow control means responsive to car body movement having fluid damping means utilizing said pressure fluid to retard movement of the control means to control the fluid pressure from said source to said valve means to vary the resistance of said valve means and thereby the energy absorption effectiveness of the said energy absorbing mechanism in damped relation to the movement of the car body from a rest position.

2. A shock absorbing system for use on motor vehicles to damp relative movements between the axle and the body of the vehicle, comprising in combination, an hydraulic movement damping apparatus disposed between the car axle and body of a vehicle and including a cylinder having an energy absorbing mechanism reciprocable therein as carried on one end of a reciprocable operating rod projecting from one end of the cylinder, said rod and cylinder being respectively secured to the car body and axle to effect said reciprocation of parts by the relative movement between the axle and body, resistance valve means in said energy absorbing mechanism resiliently held on its seat and controlling flow of hydraulic fluid between opposite sides of said energy absorbing mechanism in either direction of movement of said mechanism in said cylinder and establishing one controlled rate of energy absorption of the mechanism and including fluid pressure actuated means operable to change the effect of the resiliently acting means to change the energy absorption effectiveness of the energy absorbing mechanism, said rod having a fluid conducting passage extending longitudinally thereof conducting fluid to said fluid actuated means, a source of fluid pressure connected with said rod passage to apply fluid pressure to said fluid pressure actuated means and thereby vary the resistance to fluid flow in both directions through said valve means, and a fluid flow control means responsive to car body movement to control flow of fluid pressure from said source to said fluid pressure actuated means of said energy absorbing mechanism to change the resistance of said valve means in proportion to the degree of movement of the car body from a rest position.

3. A shock absorbing system for use on motor vehicles to damp relative movements between the axle and the body of the vehicle, comprising in combination, an hydraulic movement damping apparatus disposed between the car axle and body of a vehicle and including a cylinder having a piston reciprocable therein as carried on one end of a reciprocable operating rod projecting from one end of the cylinder, said rod and cylinder being respectively secured to the car body and axle to effect said reciprocation of parts by the relative movement between the axle and the body, said piston having a passage for flow of hydraulic fluid between opposite sides of said piston in either direction of movement in said cylinder and having a chamber for receiving pressure fluid from a source external of the apparatus, resistance valve means in said chamber resiliently urged to close said passage and control flow of hydraulic fluid between opposite sides of said piston in either direction of movement of said piston in said cylinder, said rod having a fluid conducting passage extending longitudinally thereof for conducting fluid to said chamber, a source of fluid pressure connected with said rod passage to supply fluid pressure to said chamber, and a fluid flow control means responsive to car body movement to control flow of fluid pressure from said source to said chamber for application to said valve means to change its resistance to opening for flow of hydraulic fluid therethrough whereby to change the energy absorption effectiveness of said energy absorbing mechanism in proportion to the degree of movement of the car body from a rest position.

4. A shock absorbing system in accordance with claim 3 in which the control means comprises a body having a valve means therein to control fluid flow from the said fluid pressure source to the said energy absorbing mechanism and a fluid damped weight mass operably connected with the valve means for actuation of the valve means and responsive to car body movement to effect opening of the valve means for flow of fluid pressure to the said energy absorbing mechanism on movement of the car body in either direction from a rest position.

5. A hydraulic shock absorber for use on motor vehicles, comprising, a cylinder closed at both ends, a piston reciprocable in said cylinder and mounted on the end of an operating rod projecting through one end of said cylinder, wall means around said cylinder and the opposite end thereof forming a reservoir chamber, a first valve means in the said opposite end of said cylinder responsive to pressure in said cylinder between said piston and the said opposite end thereof to open the said valve means thereby, means forming a fluid flow passage from the said one end of said cylinder to the said reservoir and controlled by the said first valve means to provide for flow of hydraulic fluid from the said cylinder upon movement of the said piston toward the said one end of said cylinder, said opposite end of said cylinder having a second valve means openable upon movement of said piston away from the said opposite end of said cylinder for flow of hydraulic fluid from the reservoir chamber into the cylinder between the said piston and the said opposite end thereof, said piston having valve means therein controlling flow of hydraulic fluid through said piston in either of opposite directions, said piston having a fluid receiving chamber operably connected with the said valve means therein to change the fluid flow characteristics of the valve means in the piston in response to changes in fluid pressure in said chamber, said rod having a fluid conducting passage extending longitudinally thereof for conduction of fluid under pressure to said chamber.

6. A hydraulic shock absorber in accordance with claim 5 in which the said valve means in said piston is a single valve having one valve area exposed to fluid pressure in the cylinder between the piston and the said opposite end of the cylinder and another valve area exposed to fluid pressure in the said cylinder between said piston and the said one end of the cylinder whereby to effect resistance to opening of the said valve in either direction of flow of fluid through the said piston.

7. A shock absorbing system for use on motor vehicles to damp relative movements between the axle and the body of the vehicle, comprising in combination, a movement damping apparatus disposed between the car axle and body of a vehicle and including an energy absorbing mechanism including resistance valve means resiliently held on its seat and operable to effect energy absorption upon relative movement between the car axle and body on either compression or rebound stroke of the movement damping apparatus, a source of fluid pressure operably connected with said energy absorbing mechanism to apply fluid pressure to said valve means to retain it on its seat resiliently to vary the energy absorption effectiveness of the energy absorbing mechanism, and a fluid damped signal means disposed externally of the movement damping apparatus energizable on movement of the car body relative to the axle to control the fluid pressure applied from said source onto said valve means to vary the energy absorption effectiveness of the said mechanism in response to actuation of the signal means.

8. A hydraulic shock absorber for use on motor vehicles, comprising, a cylinder, a piston reciprocable in said cylinder and mounted on the end of an operating rod projecting through one end of said cylinder, wall means forming a reservoir chamber, a first valve means in the opposite end of said cylinder responsive to pressure in said cylinder between said piston and the said opposite end thereof to open the said valve means thereby for flow of hydraulic fluid from the said cylinder upon movement of the said piston toward the said one end of said cylinder, said opposite end of said cylinder having a second valve means openable upon movement of said piston away from the said opposite end of said cylinder for flow of hydraulic fluid from the reservoir chamber into the cylinder between the said piston and the said opposite end thereof, said piston having valve means therein controlling flow of hydraulic fluid through said piston in either of opposite directions, said piston having a fluid receiving chamber operably connected with the said valve means therein to change the fluid flow characteristics of the valve means in the piston in response to changes in fluid pressure in the said chamber, said rod having a fluid conducting passage extending longitudinally thereof for conduction of fluid under pressure to said chamber, a source of fluid pressure connected with said rod passage to vary the fluid flow characteristics of the piston valve means, and a fluid flow control means responsive to car body movement having fluid damping means to retard movement of the control means to control the fluid pressure from said source to said fluid receiving chamber to which the fluid flow characteristics of the piston valve means in relation to the movement of the car body form a rest position.

References Cited in the file of this patent
UNITED STATES PATENTS

| | | |
|---|---|---|
| 2,006,789 | Chryst | July 2, 1935 |
| 2,036,623 | Focht | Apr. 7, 1936 |
| 2,140,359 | Hanna | Dec. 13, 1938 |
| 2,412,533 | Petrie | Dec. 10, 1946 |
| 2,698,068 | Hein | Dec. 28, 1954 |
| 2,729,308 | Koski et al. | Jan. 3, 1956 |

FOREIGN PATENTS

| | | |
|---|---|---|
| 1,067,472 | France | Jan. 27, 1954 |
| 290,983 | Great Britain | Nov. 15, 1928 |
| 341,030 | Great Britain | Jan. 6, 1931 |
| 69,631 | Netherlands | Mar. 15, 1952 |